United States Patent
Brey et al.

(10) Patent No.: US 7,925,911 B2
(45) Date of Patent: Apr. 12, 2011

(54) MANAGING COMPUTER POWER AMONG A PLURALITY OF COMPUTERS

(75) Inventors: Thomas M. Brey, Cary, NC (US);
Raymond M. Clemo, Raliegh, NC (US);
Beth F. Loebach, Raleigh, NC (US);
Gregory J. McKnight, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 771 days.

(21) Appl. No.: 11/862,762

(22) Filed: Sep. 27, 2007

(65) Prior Publication Data
US 2009/0089595 A1  Apr. 2, 2009

(51) Int. Cl.
G06F 1/00  (2006.01)
G06F 11/30  (2006.01)

(52) U.S. Cl. ........ 713/340; 713/300; 713/322; 709/208; 709/223; 700/295

(58) Field of Classification Search .............. 713/300, 713/320, 322, 340, 208, 223; 700/295
See application file for complete search history.

(56) References Cited

U.S. PATENT DOCUMENTS

| | | | |
|---|---|---|---|
| 5,719,800 A * | 2/1998 | Mittal et al. .................. | 713/321 |
| 6,721,672 B2 | 4/2004 | Spitaels et al. | |
| 6,986,069 B2 | 1/2006 | Ochler et al. | |
| 7,043,647 B2 | 5/2006 | Hansen et al. | |
| 7,051,215 B2 | 5/2006 | Zimmer et al. | |
| 7,069,463 B2 * | 6/2006 | Oh ............................... | 713/503 |
| 7,131,019 B2 | 10/2006 | Lee | |
| 7,240,225 B2 * | 7/2007 | Brewer et al. ................ | 713/300 |
| 7,386,743 B2 * | 6/2008 | Bahali et al. ................ | 713/300 |
| 7,421,599 B2 * | 9/2008 | Bahali et al. ................ | 713/320 |
| 7,444,526 B2 * | 10/2008 | Felter et al. .................. | 713/300 |
| 7,581,130 B2 * | 8/2009 | Carroll et al. ................ | 713/300 |
| 2003/0056125 A1 * | 3/2003 | O'Conner et al. .......... | 713/300 |
| 2004/0148060 A1 * | 7/2004 | Lee .............................. | 700/295 |
| 2005/0102544 A1 * | 5/2005 | Brewer et al. ................ | 713/320 |
| 2006/0010330 A1 | 1/2006 | Wu et al. | |
| 2006/0082222 A1 | 4/2006 | Pincu et al. | |
| 2006/0156041 A1 | 7/2006 | Zaretsky et al. | |

(Continued)

*Primary Examiner* — Mark Connolly
(74) *Attorney, Agent, or Firm* — H. Artoush Ohanian; Cynthia G. Seal; Biggers & Ohanian, LLP.

(57) ABSTRACT

Methods, systems, and computer program products are provided for managing computer power among a plurality of computers so that the aggregate power consumption does not exceed a maximum subscription amount, the maximum subscription amount comprising the maximum amount of power that can be supplied to the plurality of computers. Embodiments include monitoring, by a central power management module, aggregate power consumption of the plurality of computers; the central power management module and the computers coupled for data communications through a power management network; determining, by the central power management module, whether the aggregate power consumption exceeds a predetermined maximum aggregate power threshold, the maximum aggregate power threshold less than the maximum subscription amount; if the aggregate power consumption exceeds the predetermined maximum aggregate power threshold, throttling-down the plurality of computers, reducing the aggregate power consumption to a level below the predetermined maximum aggregate power threshold. Typical embodiments also include determining, by a central power management module, whether the aggregate power consumption is below a predetermined minimum aggregate power threshold; and if the aggregate power consumption is below a predetermined minimum aggregate power threshold, throttling-up the plurality of computers increasing the aggregate power consumption to a level that exceeds the predetermined minimum threshold.

18 Claims, 7 Drawing Sheets

U.S. PATENT DOCUMENTS

| | | |
|---|---|---|
| 2006/0161794 A1 | 7/2006 | Chiasson et al. |
| 2006/0230299 A1 | 10/2006 | Zaretsky et al. |
| 2006/0253715 A1* | 11/2006 | Ghiasi et al. ................. 713/300 |
| 2008/0215900 A1* | 9/2008 | Bahali et al. .................. 713/300 |
| 2009/0089595 A1* | 4/2009 | Brey et al. .................... 713/300 |
| 2009/0132842 A1* | 5/2009 | Brey et al. .................... 713/322 |

* cited by examiner

MANAGING COMPUTER POWER AMONG A PLURALITY OF COMPUTERS

BACKGROUND OF THE INVENTION

1. Field of the Invention

The field of the invention is data processing, or, more specifically, methods, apparatus, and products for managing computer power among a plurality of computers.

2. Description of Related Art

All computers consume power. Because power is a significant expense to many companies, managing power is an important consideration for systems administrators. Another important consideration for systems administrators is that often current safety regulations preclude configuring computers such that the total maximum power consumption may exceed the input circuit power available. Under such safety regulations, it is often forbidden to oversubscribe the circuit power by configuring a number of computers such that total power may be greater than the total circuit. There is therefore an ongoing need for improvement in managing computer power consumption.

SUMMARY OF THE INVENTION

Methods, systems, and computer program product are provided for managing computer power among a plurality of computers so that the aggregate power consumption does not exceed a maximum subscription amount, the maximum subscription amount comprising the maximum amount of power that can be supplied to the plurality of computers. Embodiments include monitoring, by a central power management module, aggregate power consumption of the plurality of computers; the central power management module and the computers coupled for data communications through a power management network; determining, by the central power management module, whether the aggregate power consumption exceeds a predetermined maximum aggregate power threshold, the maximum aggregate power threshold less than the maximum subscription amount; if the aggregate power consumption exceeds the predetermined maximum aggregate power threshold, throttling-down the plurality of computers, reducing the aggregate power consumption to a level below the predetermined maximum aggregate power threshold. Typical embodiments also include determining, by a central power management module, whether the aggregate power consumption is below a predetermined minimum aggregate power threshold; and if the aggregate power consumption is below a predetermined minimum aggregate power threshold, throttling-up the plurality of computers increasing the aggregate power consumption to a level that exceeds the predetermined minimum threshold.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
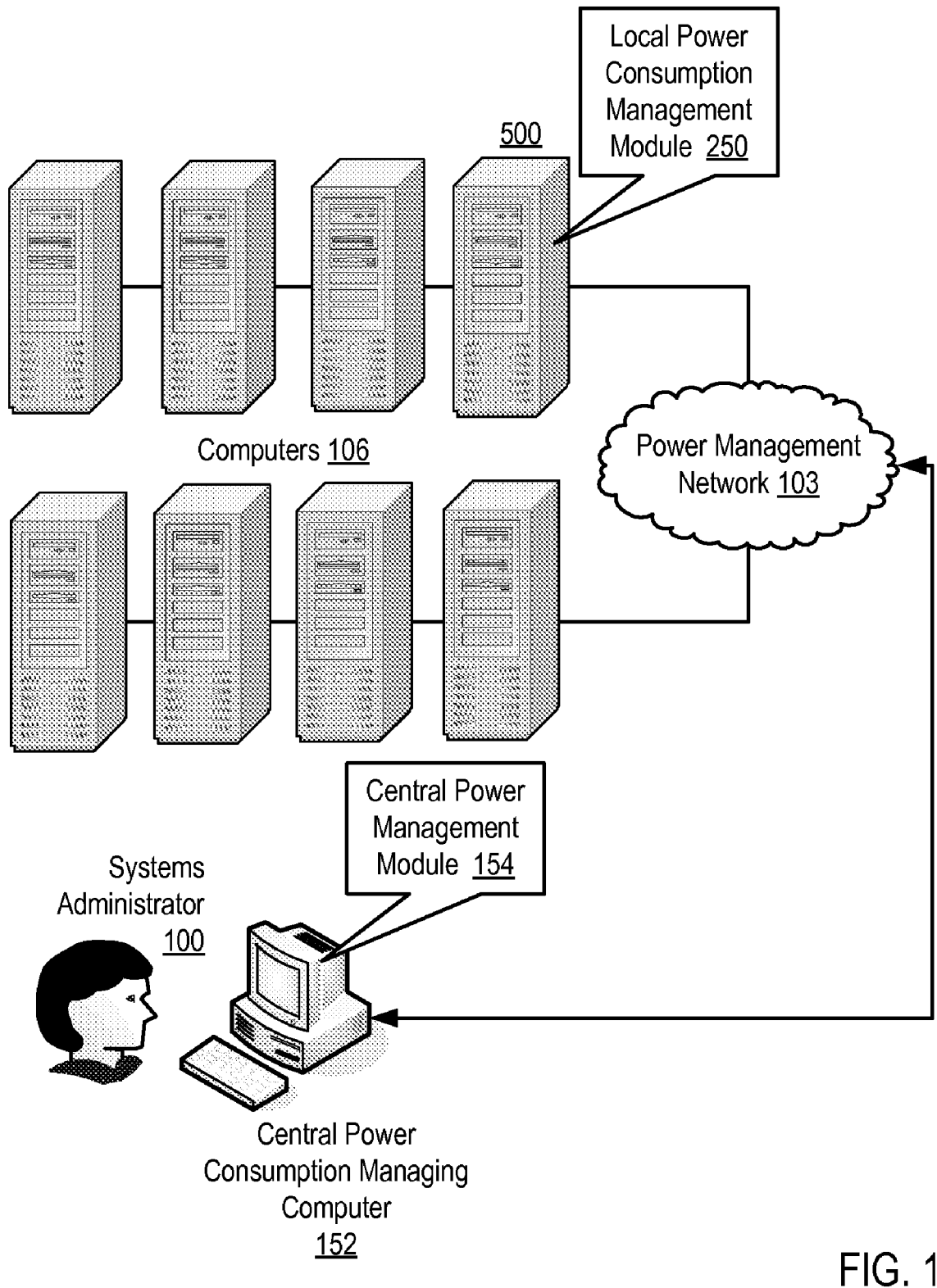
FIG. 1 sets forth a network diagram of a system for managing computer power among a plurality of computers so that the aggregate power consumption does not exceed a maximum subscription amount according to embodiments of the present invention.

Exemplary methods, systems, and products for managing computer power among a plurality of computers so that the aggregate power consumption does not exceed a maximum subscription amount in accordance with the present invention are described with reference to the accompanying drawings, beginning with FIG. 1. FIG. 1 sets forth a network diagram of a system for managing computer power among a plurality of computers so that the aggregate power consumption does not exceed a maximum subscription amount according to embodiments of the present invention.

A maximum subscription amount is the maximum amount of power that can be supplied to the plurality of computers. The maximum subscription amount is the maximum possible aggregate power delivered to the computers by a circuit providing that power without exceeding the rating of the circuit. Oversubscription of a power circuit occurs when the possible aggregate power consumption of the computers powered by the circuit center exceeds the rating of the circuit powering the computers.

The system of FIG. 1 includes a plurality of computers (106). In the example of FIG. 1 each of the computers (106) is being supplied power individually from a shared circuit that receives a shared power supply. That is, each computer of FIG. 1 is independently supplied power from a common circuit receiving shared electrical supply. The example of FIG. 1 having each of the computers being supplied power individually from a shared circuit is for explanation and not for limitation. In fact, in many computer systems multiple racks of computers share a single power supply which is in turn independently supplied from the common circuit.

Each of the computers (106) of FIG. 1 has installed upon it or is supported by a local power consumption module (250) capable of monitoring the power consumption of the computer or computers which the local power consumption management module supports. That is, a single local power consumption management module (250) may monitor the power consumption of one or more of the computers (106) of FIG. 1.

The local power management module (250) of FIG. 1 includes computer program instructions capable of monitoring the local power consumption of the computer or computers that it supports. The local power consumption management module of FIG. 1 is capable of monitoring the power consumption of the computer or computers that it supports by receiving the power consumption from a dedicated circuit for measuring power consumption in the power distribution unit providing power to those one or more computers.

The local power consumption management module (150) is coupled for data communications to a central power management module (154) and is capable of providing the value of the power consumption of the computers it supports to the central power management module (154). The power management network (103) may be implemented as a packet-switched network, circuit-switched network or any other network capable of transmitting the value of the power consumed by the computers supported by the local power management module.

In the example of FIG. 1, the central power management module (154) is installed on a central power consumption managing computer (152). The central power management module (154) includes computer program instructions capable of monitoring aggregate power consumption of the plurality of computers; determining whether the aggregate power consumption exceeds a predetermined maximum aggregate power threshold; and throttling-down the plurality of computers if the aggregate power consumption exceeds the predetermined maximum aggregate power threshold, thereby reducing the aggregate power consumption to a level below the predetermined maximum aggregate power threshold.

The maximum aggregate power threshold is established as less than the maximum subscription amount. As mentioned above, oversubscription of a power circuit occurs when the possible aggregate power consumption of the computers powered by the circuit exceeds the rating of the circuit powering the computers. Establishing a maximum aggregate power threshold below the rating of the power circuit allows the circuit to be oversubscribed with computers whose aggregate maximum power consumption otherwise could exceed the rating of the circuit and also provides the needed protection for the circuit. That is, if the aggregate power consumption of the computers does not exceed the predetermined maximum aggregate power threshold the operation of the computers will remain unaffected regardless of the subscription level of the computers and if the aggregate power consumption of the computers does exceed the predetermined maximum aggregate power threshold the computers will be throttled-down.

The local power consumption management module (250) of FIG. 1 is also capable of determining that the least one (500) of the computers (106) supported by the local power consumption module has lost data communications with the central power management module (154). In response to determining that the computer (500) that the local power consumption management module (250) supports has lost data communications with the central power management module (154), the local power consumption management module (250) of FIG. 1 is capable of determining whether the power consumption of the computer (500) supported by the local power management module (250) exceeds a predetermined local maximum threshold. If the power consumption of the computer (500) exceeds the predetermined local maximum threshold (510), the local power consumption management module is capable of throttling-down the computer (500) thereby reducing the power consumption of the computer (500) to a level below the predetermined local maximum threshold (510).

The local power consumption management module (250) of FIG. 1 is also capable of determining whether the power consumption of the one or more computers (500) supported by the local power management module (250) is below a predetermined local minimum threshold. If the power consumption of the computer (500) is below the predetermined local minimum threshold, the local power consumption management module is capable of throttling-up the one or more computers (500).

The arrangement of computers and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Managing computer power among a plurality of computers so that the aggregate power consumption does not exceed a maximum subscription amount in accordance with the present invention is generally implemented with computers, that is, with automated computing machinery. For further explanation, therefore, FIG. 2 sets forth a block diagram of automated computing machinery comprising an exemplary central power consumption managing computer (152) useful in managing computer power among a plurality of computers so that the aggregate power consumption does not exceed a maximum subscription amount according to embodiments of the present invention. The central power consumption managing computer (152) of FIG. 2 includes at least one computer processor (156) or 'CPU' as well as random access memory (168) ('RAM') which is connected through a high speed memory bus (166) and bus adapter (158) to processor (156) and to other components of the central power consumption managing computer (152).

Stored in RAM (168) is a central power management module (154), a module of computer program instructions for managing computer power among a plurality of computers so that the aggregate power consumption does not exceed a maximum subscription amount. The central power management module (154) includes computer program instructions for monitoring aggregate power consumption of the plurality of computers; the central power management module and the computers coupled for data communications through a power management network; determining whether the aggregate power consumption exceeds a predetermined maximum aggregate power threshold, the maximum aggregate power threshold less than the maximum subscription amount; and if the aggregate power consumption exceeds the predetermined maximum aggregate power threshold, throttling-down the plurality of computers, reducing the aggregate power consumption to a level below the predetermined maximum aggregate power threshold. The central power management module (154) includes computer program instruction for determining whether the aggregate power consumption is below a predetermined minimum aggregate power threshold; and if the aggregate power consumption is below a predetermined minimum aggregate power threshold, throttling-up the plurality of computers increasing the aggregate power consumption to a level that exceeds the predetermined minimum threshold.

Also stored in RAM (168) is an operating system (154). Operating systems useful in managing computer power among a plurality of computers so that the aggregate power consumption does not exceed a maximum subscription amount according to embodiments of the present invention include UNIX™, Linux™, Microsoft XP™, AIX™, IBM's i5/OS™, and others as will occur to those of skill in the art. The operating system (154) and central power management module (154) in the example of FIG. 2 are shown in RAM (168), but many components of such software typically are stored in non-volatile memory also, such as, for example, on a disk drive (170).

Figure 2:
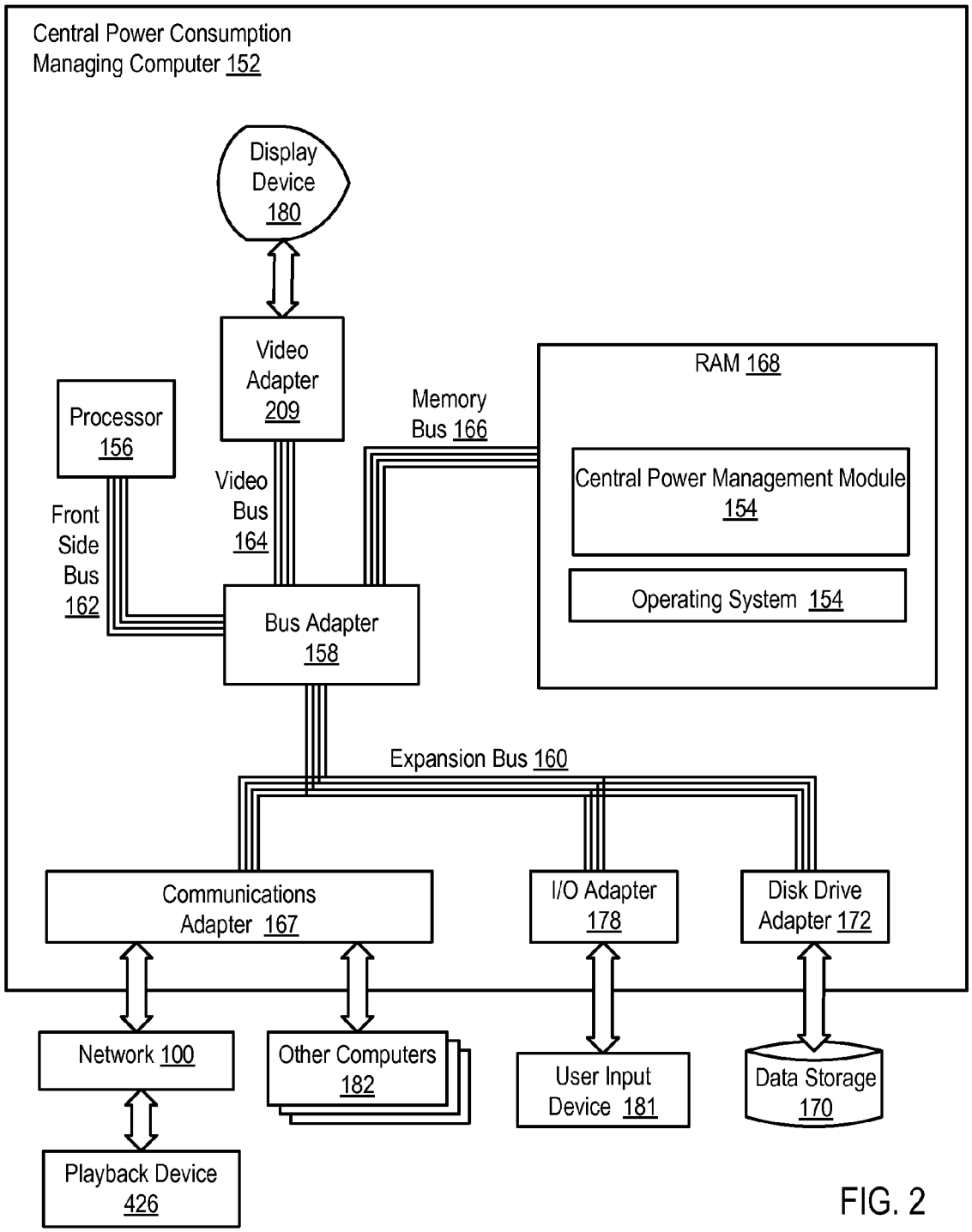
FIG. 2 sets forth a block diagram of automated computing machinery comprising an exemplary central power consumption managing computer useful in managing computer power among a plurality of computers so that the aggregate power consumption does not exceed a maximum subscription amount according to embodiments of the present invention.

The central power consumption managing computer (152) of FIG. 2 also includes disk drive adapter (172) coupled through expansion bus (160) and bus adapter (158) to processor (156) and other components of the central power consumption managing computer (152). Disk drive adapter (172) connects non-volatile data storage to the power consumption managing computer (152) in the form of disk drive (170). Disk drive adapters useful in computers for managing computer power among a plurality of computers so that the aggregate power consumption does not exceed a maximum subscription amount according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example central power consumption managing computer (152) of FIG. 2 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example central power consumption managing computer (152) of FIG. 2 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary power consumption managing computer (152) of FIG. 2 includes a communications adapter (167) for data communications with other computers (182) and for data communications with a data communications network (100). Such data communications may be carried out serially through RS-232 connections, through external buses such as a Universal Serial Bus ('USB'), through data communications data communications networks such as IP data communications networks, and in other ways as will occur to those of skill in the art. Communications adapters implement the hardware level of data communications through which one computer sends data communications to another computer, directly or through a data communications network. Examples of communications adapters useful for managing computer power among a plurality of computers so that the aggregate power consumption does not exceed a maximum subscription amount according to embodiments of the present invention include modems for wired dial-up communications, Ethernet (IEEE 802.3) adapters for wired data communications network communications, and 802.11 adapters for wireless data communications network communications.

As mentioned above, one or more of the individual computers of whose aggregate power consumption may be monitored according to some embodiments of the present invention may support a local power management module (250). For further explanation, FIG. 3 forth a block diagram of automated computing machinery comprising an exemplary computer (500) useful in managing computer power among a plurality of computers so that the aggregate power consumption does not exceed a maximum subscription amount according to embodiments of the present invention. The computer (500) of FIG. 3 includes many of the same components as those described above with reference to FIG. 2 and those components operate in a manner similar to those described above with reference to FIG. 2.

Figure 3:
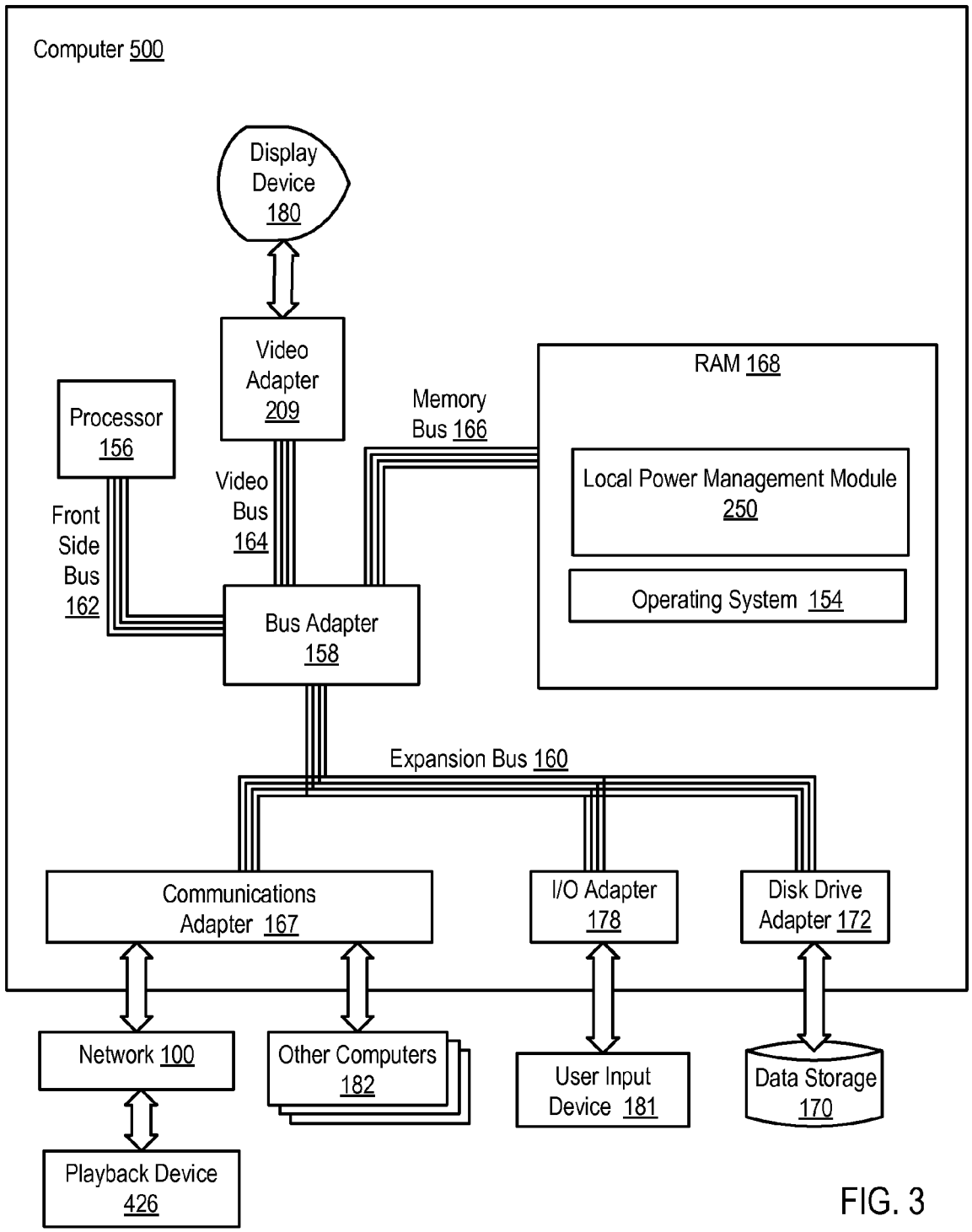
FIG. 3 forth a block diagram of automated computing machinery comprising an exemplary computer useful in managing computer power among a plurality of computers so that the aggregate power consumption does not exceed a maximum subscription amount according to embodiments of the present invention.

Stored in RAM (168) of the exemplary computer (500) of FIG. 3 is a local power management module (250), a module of computer program instructions capable of determining that the least one of the computers supported by the local power consumption module has lost data communications with the central power management module; determining whether the power consumption of the computer (500) exceeds a predetermined local maximum threshold; and throttling-down the computer (500) if the power consumption of the computer (500) exceeds the predetermined local maximum threshold (510), thereby reducing the power consumption of the computer (500) to a level below the predetermined local maximum threshold (510). The local power consumption management module (250) also includes computer program instructions capable of determining whether the power consumption of the one or more computers supported by the local power management module (250) is below a predetermined local minimum threshold; and throttling-up the one or more computers (500) if the power consumption of the computer (500) is below the predetermined local minimum threshold.

Figure 4:
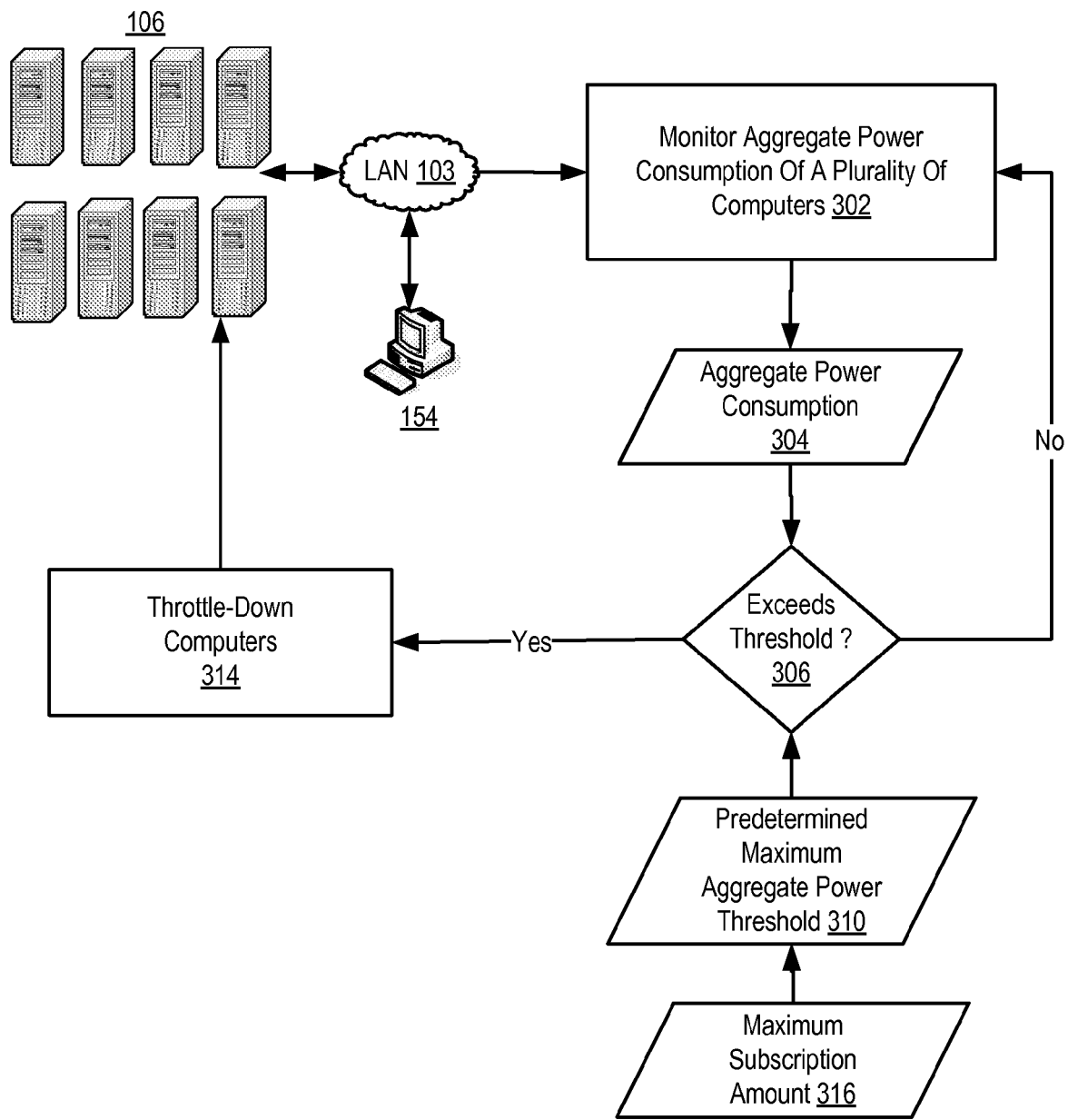
FIG. 4 sets forth a flow chart illustrating an exemplary method for managing computer power among a plurality of computers so that the aggregate power consumption does not exceed a maximum subscription amount.

For further explanation, FIG. 4 sets forth a flow chart illustrating an exemplary method for managing computer power among a plurality of computers (106) so that the aggregate power consumption does not exceed a maximum subscription amount. The maximum subscription is the maximum amount of power that can be supplied to the plurality of computers (106). A maximum subscription amount is typically established to meet the ratings of the infrastructure and circuit of the power supply providing power to the computers.

The method of FIG. 4 includes monitoring (302), by a central power management module (154), aggregate power consumption (304) of the plurality of computers (106). Monitoring (302), by a central power management module (154), aggregate power consumption (304) of the plurality of computers (106) may be carried out by receiving individually from local power management modules the value of the amount of power consumed by the computers supported by those local power management modules. A central power management module may then determine the aggregate power consumption by summing the individual values provided by the local power management modules.

In the example of FIG. 4, the central power management module (154) and the computers (106) coupled for data communications through a power management network (103). The power management network (103) may be implemented as a packet-switched network, circuit-switched network or any other network capable of transmitting the value of the power consumed by the computers supported by the local power management module.

The method of FIG. 4 includes determining (306), by the central power management module (254), whether the aggregate power consumption (304) exceeds a predetermined maximum aggregate power threshold (310), the maximum aggregate power threshold (310) less than the maximum subscription amount (316). Determining (306), by the central power management module (254), whether the aggregate power consumption (304) exceeds a predetermined maximum aggregate power threshold (310), the maximum aggregate power threshold (310) less than the maximum subscription amount (316) may be carried out by comparing the aggregate power consumption with the predetermined maximum aggregate threshold. Such a predetermined maximum threshold may be established by a systems administrator to meet oversubscription power objectives. That is, the predetermined maximum aggregate power threshold (310) is established as less then the total subscription amount allowing a systems administrator to oversubscribe the circuit and still provide protection to the circuit.

If the aggregate power consumption (304) exceeds the predetermined maximum aggregate power threshold (310), the method of FIG. 4 includes throttling-down (314) the plurality of computers (106). Throttling-down the computers may be carried out by reducing the CPU clock speed of the computers. Throttling-down the computers also may be carried out by reducing the data communications bus clock speed of the computers. Data communications bus clock speeds that may be reduced to throttle-down the computers include I/O bus clock speeds, memory bus clock speeds, and so on as will occur to those of skill in the art.

The method of FIG. 4 may be carried out repeatedly until throttling-down the computers results in reducing the aggregate power consumption to a level below the predetermined maximum aggregate power threshold.

Once the aggregate power consumption of the computers has been reduced below the predetermined maximum aggregate power threshold, continuing the operation of throttled-down computers may result in unnecessary energy conservation at the expense of productivity. For further explanation, therefore, FIG. 5 sets forth a flow chart illustrating additional exemplary aspects of a method for managing computer power among a plurality of computers so that the aggregate power consumption does not exceed a maximum subscription amount in accordance with embodiments of the present invention.

The method of FIG. 5 includes continuing monitoring (302) aggregate power consumption (304) of the computers and determining (402), by a central power management module (154), whether the aggregate power consumption (304) is below a predetermined minimum aggregate power threshold (404). Determining (402), by a central power management module (154), whether the aggregate power consumption (304) is below a predetermined minimum aggregate power threshold (404) may be carried out by comparing the aggregate power consumption with the predetermined minimum aggregate power threshold. Such a predetermined minimum aggregate power threshold may be established by a systems administrator to meet power objectives.

If the aggregate power consumption (304) is below a predetermined minimum aggregate power threshold (404), the method of FIG. 5 includes throttling-up (406) the plurality of computers (106). Throttling-up the computers may be carried out by increasing the CPU clock speed of the computers, or increasing the data communications bus clock speeds of the computers, or in other ways as will occur to those of skill in the art.

Figure 5:
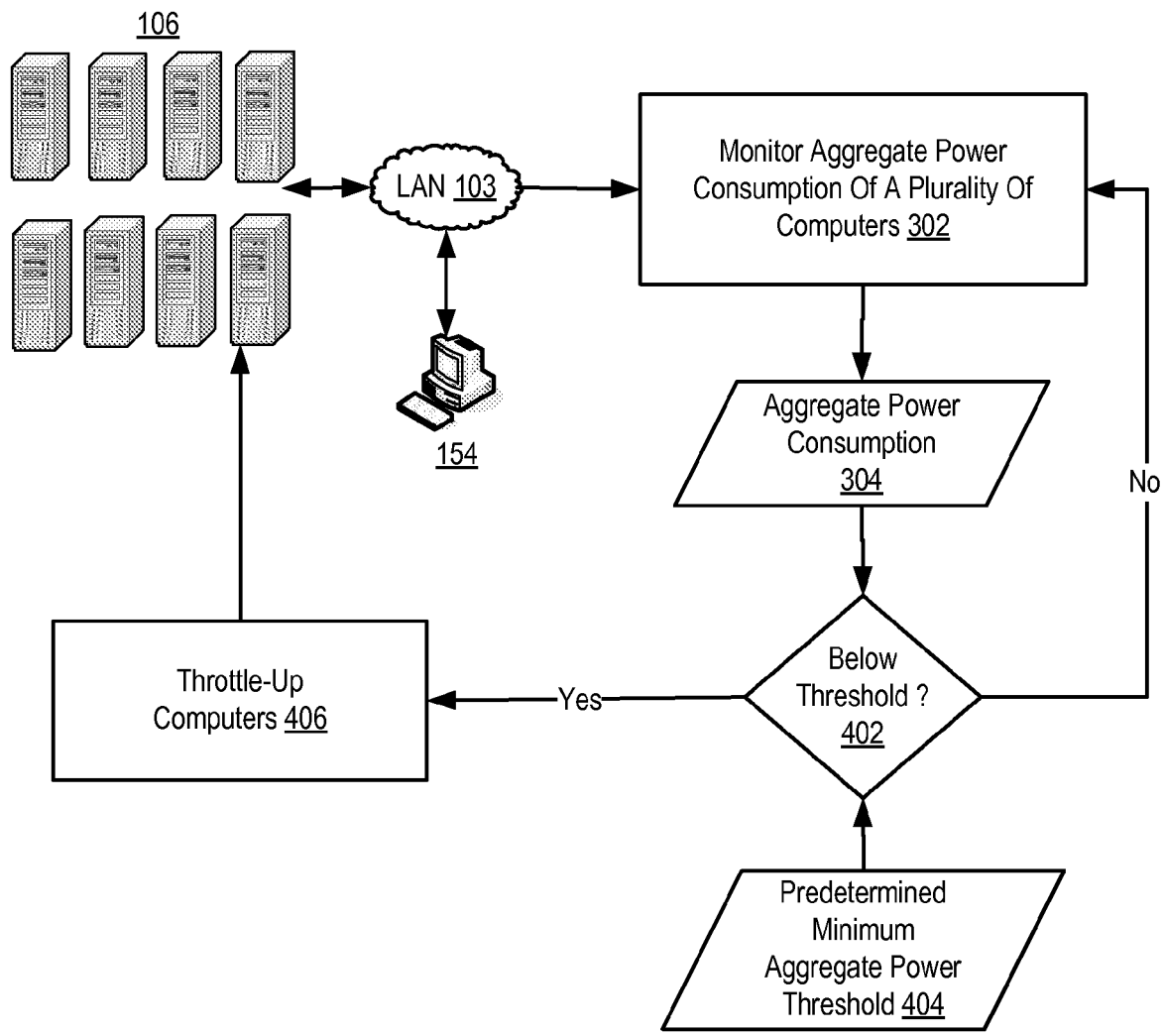
FIG. 5 sets forth a flow chart illustrating additional exemplary aspects of a method for managing computer power among a plurality of computers so that the aggregate power consumption does not exceed a maximum subscription amount in accordance with embodiments of the present invention.

The method of FIG. 5 may be carried out repeatedly until throttling-up the computers results in increasing the aggregate power consumption to a level that exceeds the predetermined minimum threshold.

As mentioned above, one or more of the individual computers of whose aggregate power consumption may be monitored according to some embodiments of the present invention may support a local power management module (250) which may perform additional aspects of managing computer power among a plurality of computers so that the aggregate power consumption does not exceed a maximum subscription amount according to the present invention. For further explanation, FIG. 6 sets forth a flow chart illustrating some additional aspects of managing computer power among a plurality of computers so that the aggregate power consumption does not exceed a maximum subscription amount according to some embodiments of the present invention. The method of FIG. 6 includes determining (502), by at least one local power management module (250) supporting one (500) or more of the plurality of computers, that the one or more computers (500) has lost data communications with the central power management module (154). Determining (502), by at least one local power management module (250) supporting one (500) or more of the plurality of computers, that the one or more computers (500) has lost data communications with the central power management module (154) may be carried out by periodically pinging the central power management module and identifying that a response was not received within a specified time period for response.

Figure 6:
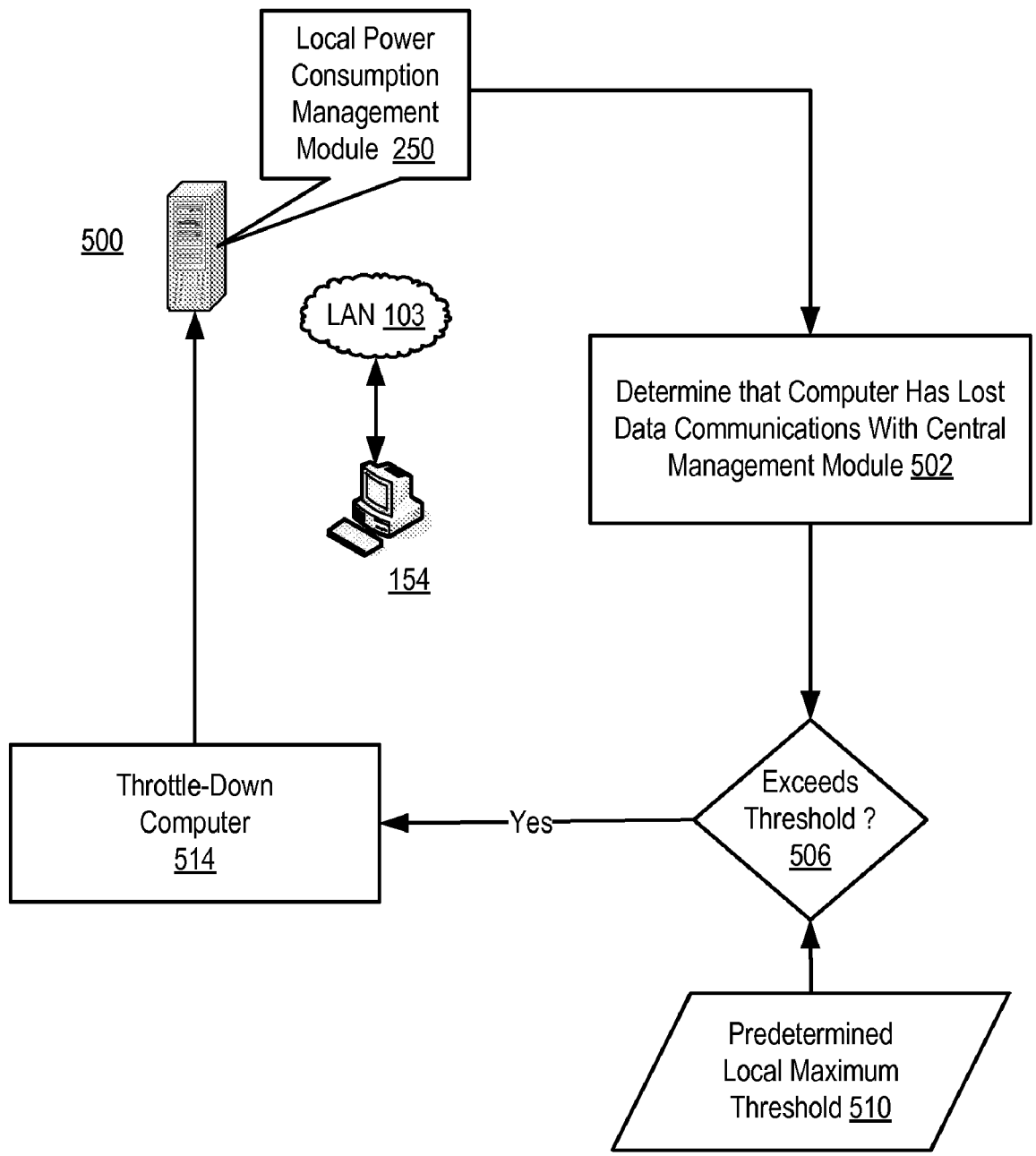
FIG. 6 sets forth a flow chart illustrating some additional aspects of managing computer power among a plurality of computers so that the aggregate power consumption does not exceed a maximum subscription amount according to some embodiments of the present invention.

The method of FIG. 6 also includes determining (506), by the local power management module (250), whether the power consumption of the one or more computers (500) supported by the local power management module (250) exceeds a predetermined local maximum threshold (510). Determining (506), by the local power management module (250), whether the power consumption of the one or more computers (500) supported by the local power management module (250) exceeds a predetermined local maximum threshold (510) may be carried out by comparing the power consumption of one or more computer (500) supported by the local power management module (250) with the predetermined local maximum threshold (510).

The predetermined local maximum threshold may be predetermined by a system administrator. Such a predetermined local maximum threshold may be established and assigned to each set of computers supported by a local power management module such that the aggregate power of all the computers does not exceed the subscription amount.

If the power consumption of the one or more computers (500) exceeds the predetermined local maximum threshold (510), the method of FIG. 6 includes throttling-down (514) the one or more computers (500). Throttling-down (514) the one or more computers (500). Throttling-down the computers may be carried out by reducing the CPU clock speed of the computers. Throttling-down the computers also may be carried out by reducing the data communications bus clock speed of the computers. Data communications bus clock speeds that may be reduced to throttle-down the computers include I/O bus clock speeds, memory bus clock speeds, and so on as will occur to those of skill in the art.

The method of FIG. 6 may be carried out repeatedly until throttling-down the one or more computers results in reducing the power consumption of the one or more computers (500) to a level below the predetermined local maximum threshold (510).

Once the power consumption of the one or more computers has been reduced below the predetermined local maximum power threshold, continuing the operation of throttled-down computers may result in unnecessary energy conservation at the expense of productivity. For further explanation, therefore, FIG. 7 sets forth a flow chart illustrating additional exemplary aspects of a method for managing computer power among a plurality of computers so that the aggregate power consumption does not exceed a maximum subscription amount in accordance with embodiments of the present invention. The method of FIG. 7 includes determining (606), by the local power management module (250), whether the power consumption of the one or more computers (500) supported by the local power management module (250) is below (606) a predetermined local minimum threshold (610). Such a predetermined local minimum threshold (610) may be established by a systems administrator to reduce unnecessary energy conservation at the expense of productivity.

If the power consumption of the one or more computers (500) is below the predetermined local minimum threshold (610), the method of FIG. 7 includes throttling-up (614) the one or more computers (500). Throttling-up the computers may be carried out by increasing the CPU clock speed of the one or more of the computers, increasing the data communications bus clock speeds of the one or more of the computers, or in other ways as will occur to those of skill in the art.

Figure 7:
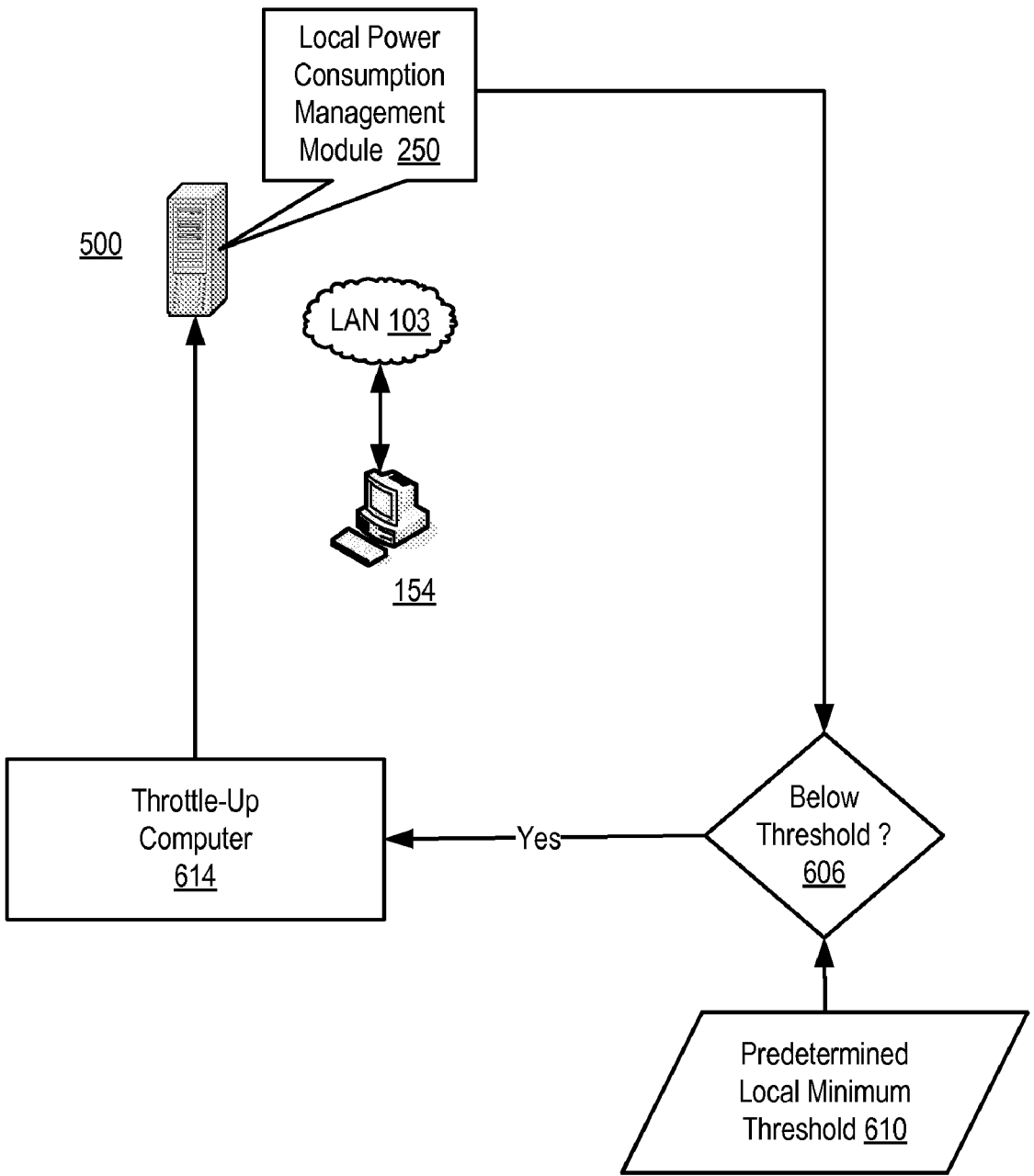
FIG. 7 sets forth a flow chart illustrating additional exemplary aspects of a method for managing computer power among a plurality of computers so that the aggregate power consumption does not exceed a maximum subscription amount in accordance with embodiments of the present invention.

The method of FIG. 7 may be carried out repeatedly until throttling-up the one or more computers results in increasing the power consumption of the one or more computers to a level above the predetermined local minimum threshold.

Exemplary embodiments of the present invention are described largely in the context of a fully functional computer system for managing computer power among a plurality of computers so that the aggregate power consumption does not exceed a maximum subscription amount. Readers of skill in the art will recognize, however, that the present invention also may be embodied in a computer program product disposed on signal bearing media for use with any suitable data processing system. Such signal bearing media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets and networks that communicate with the Internet Protocol and the World Wide Web as well as wireless transmission media such as, for example, networks implemented according to the IEEE 802.11 family of specifications. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method for managing computer power among a plurality of computers so that the aggregate power consumption does not exceed a maximum subscription amount, the maximum subscription amount comprising the maximum amount of power that can be supplied to the plurality of computers, the method comprising:
   monitoring, by a central power management module, aggregate power consumption of the plurality of computers, the central power management module and the computers coupled for data communications through a power management network;
   determining, by the central power management module, whether the aggregate power consumption exceeds a predetermined maximum aggregate power threshold, the maximum aggregate power threshold less than the maximum subscription amount;
   if the aggregate power consumption exceeds the predetermined maximum aggregate power threshold, throttling-down the plurality of computers, reducing the aggregate power consumption to a level below the predetermined maximum aggregate power threshold;
   determining, by at least one local power management module supporting one or more of the plurality of computers, that the one or more computers has lost data communications with the central power management module; and
   controlling, by the at least one local power management module, power consumption of the one or more computers that have lost data communications with the central power management module.

2. The method of claim 1 further comprising:
   determining, by the central power management module, whether the aggregate power consumption is below a predetermined minimum aggregate power threshold; and
   if the aggregate power consumption is below the predetermined minimum aggregate power threshold, throttling-up the plurality of computers increasing the aggregate power consumption to a level that exceeds the predetermined minimum threshold.

3. The method of claim 1 further comprising:
   determining, by the local power management module, whether the power consumption of the one or more computers supported by the local power management module exceeds a predetermined local maximum threshold;
   if the power consumption of the one or more computers exceeds the predetermined local maximum threshold, throttling-down the one or more computers, reducing the power consumption of the one or more computers to a level below the predetermined local maximum threshold.

4. The method of claim 3 further comprising:
   determining, by the local power management module, whether the power consumption of the one or more computers supported by the local power management module is below a predetermined local minimum threshold;
   if the power consumption of the one or more computers is below the predetermined local minimum threshold, throttling-up the one or more computers, increasing the power consumption of the one or more computers to a level above the predetermined local minimum threshold.

5. The method of claim 1 wherein throttling down the computers further comprises reducing the CPU clock speed of the plurality of computers.

6. The method of claim 1 wherein throttling down the computers further comprises reducing a data communications bus clock speed of the plurality of computers.

7. A system for managing computer power among a plurality of computers so that the aggregate power consumption does not exceed a maximum subscription amount, the maximum subscription amount comprising the maximum amount of power that can be supplied to the plurality of computers, the system comprising a computer processor, a computer memory operatively coupled to the computer processor, the computer memory having disposed within it computer program instructions that when executed by the computer processor, causes the computer processor to carry out the steps of:
   monitoring aggregate power consumption of the plurality of computers the central power management module and the computers coupled for data communications through a power management network;
   determining whether the aggregate power consumption exceeds a predetermined maximum aggregate power threshold, the maximum aggregate power threshold less than the maximum subscription amount;
   if the aggregate power consumption exceeds the predetermined maximum aggregate power threshold, throttling-down the plurality of computers, reducing the aggregate power consumption to a level below the predetermined maximum aggregate power threshold
   determining, by at least one local power management module supporting one or more of the plurality of computers, that the one or more computers has lost data communications with the central power management module; and
   controlling, by the at least one local power management module, power consumption of the one or more computers that have lost data communications with the central power management module.

8. The system of claim 7 wherein the computer memory also has disposed within it computer program instructions capable of:
   determining whether the aggregate power consumption is below a predetermined minimum aggregate power threshold; and
   if the aggregate power consumption is below the predetermined minimum aggregate power threshold, throttling-up the plurality of computers increasing the aggregate power consumption to a level that exceeds the predetermined minimum threshold.

9. The system of claim 7 further comprising an additional computer processor, an additional computer memory operatively coupled to the additional computer processor, the additional computer memory having disposed within it computer program instructions capable of
   determining, by the local power management module, whether the power consumption of the one or more computers supported by the local power management module exceeds a predetermined local maximum threshold;
   if the power consumption of the one or more computers exceeds the predetermined local maximum threshold, throttling-down the one or more computers, reducing the power consumption of the one or more computers to a level below the predetermined local maximum threshold.

10. The system of claim 9 wherein the additional computer memory having disposed within it computer program instructions capable of:
    determining, by the local power management module, whether the power consumption of the one or more computers supported by the local power management module is below a predetermined local minimum threshold;
    if the power consumption of the one or more computers is below the predetermined local minimum threshold, throttling-up the one or more computers, increasing the power consumption of the one or more computers to a level above the predetermined local minimum threshold.

11. The system of claim 7 wherein computer program instructions capable of throttling down the computers further comprise computer program instructions capable of reducing the CPU clock speed of the plurality of computers.

12. The system of claim 7 wherein computer program instructions capable of throttling down the computers further comprise computer program instructions capable of reducing a data communications bus clock speed of the plurality of computers.

13. A computer program product for managing computer power among a plurality of computers so that the aggregate power consumption does not exceed a maximum subscription amount, the maximum subscription amount comprising the maximum amount of power that can be supplied to the plurality of computers, the computer program product disposed in a recordable computer readable medium, the computer program product comprising computer program instructions that when executed by the computer processor, causes the computer processor to carry out the steps of:
    monitoring aggregate power consumption of the plurality of computers, the central power management module and the computers coupled for data communications through a power management network;
    determining whether the aggregate power consumption exceeds a predetermined maximum aggregate power threshold, the maximum aggregate power threshold less than the maximum subscription amount;
    if the aggregate power consumption exceeds the predetermined maximum aggregate power threshold, throttling-down the plurality of computers, reducing the aggregate power consumption to a level below the predetermined maximum aggregate power threshold;
    determining, by at least one local power management module supporting one or more of the plurality of computers, that the one or more computers has lost data communications with the central power management module; and
    controlling, by the at least one local power management module, power consumption of the one or more computers that have lost data communications with the central power management module.

14. The computer program product of claim 13 further comprising computer program instructions capable of:
    determining whether the aggregate power consumption is below a predetermined minimum aggregate power threshold; and
    if the aggregate power consumption is below the predetermined minimum aggregate power threshold, throttling-up the plurality of computers increasing the aggregate power consumption to a level that exceeds the predetermined minimum threshold.

15. The computer program product of claim 13 further comprising computer program instructions capable of
    determining, by the local power management module, whether the power consumption of the one or more computers supported by the local power management module exceeds a predetermined local maximum threshold;

if the power consumption of the one or more computers exceeds the predetermined local maximum threshold, throttling-down the one or more computers, reducing the power consumption of the one or more computers to a level below the predetermined local maximum threshold.

16. The computer program product of claim 15 further comprising computer program instructions capable of:

determining, by the local power management module, whether the power consumption of the one or more computers supported by the local power management module is below a predetermined local minimum threshold;

if the power consumption of the one or more computers is below the predetermined local minimum threshold, throttling-up the one or more computers, increasing the power consumption of the one or more computers to a level above the predetermined local minimum threshold.

17. The computer program product of claim 13 wherein computer program instructions capable of throttling down the computers further comprise computer program instructions capable of reducing the CPU clock speed of the plurality of computers.

18. The computer program product of claim 13 wherein computer program instructions capable of throttling down the computers further comprise computer program instructions capable of reducing a data communications bus clock speed of the plurality of computers.

* * * * *